(12) United States Patent
Miyazaki

(10) Patent No.: US 7,902,289 B2
(45) Date of Patent: Mar. 8, 2011

(54) RUBBER COMPOSITION FOR BELT LAYER STEEL CORD AND STEEL CORD COATED BY THE SAME

(75) Inventor: Tatsuya Miyazaki, Kobe (JP)

(73) Assignee: Sumitomo Rubber Industries, Ltd., Kobe-Shi, Hyogo-Ken (JP)

( * ) Notice: Subject to any disclaimer, the term of this patent is extended or adjusted under 35 U.S.C. 154(b) by 1005 days.

(21) Appl. No.: 11/043,924

(22) Filed: Jan. 28, 2005

(65) Prior Publication Data

US 2005/0192386 A1 Sep. 1, 2005

(30) Foreign Application Priority Data

Feb. 26, 2004 (JP) ................. 2004-051434

(51) Int. Cl.
| | |
|---|---|
| C08K 3/00 | (2006.01) |
| C08K 3/10 | (2006.01) |
| C08K 3/30 | (2006.01) |
| C08G 67/02 | (2006.01) |
| C08F 8/30 | (2006.01) |
| B60C 9/00 | (2006.01) |
| B60C 1/00 | (2006.01) |

(52) U.S. Cl. ........ 524/575.5; 524/612; 524/555; 524/413; 524/418; 152/526; 152/537

(58) Field of Classification Search .......... 524/100, 524/418, 435, 316, 446, 110, 284, 320, 575.5, 524/612, 555, 413; 428/462, 465, 492; 525/332.6; 152/526, 537

See application file for complete search history.

(56) References Cited

U.S. PATENT DOCUMENTS

| | | | |
|---|---|---|---|
| 4,947,916 A | | 8/1990 | Ishikawa et al. |
| 5,174,838 A | * | 12/1992 | Sandstrom et al. ........ 152/209.5 |
| 5,196,464 A | | 3/1993 | Shinoda et al. |
| 5,252,405 A | * | 10/1993 | Kaido et al. .................. 428/462 |
| 5,268,402 A | | 12/1993 | Daio et al. |
| 6,120,911 A | * | 9/2000 | Beers et al. ..................... 428/457 |
| 2003/0060551 A1 | * | 3/2003 | Mizuno et al. ................ 524/418 |

FOREIGN PATENT DOCUMENTS

| | | |
|---|---|---|
| DE | 41 18 180 A1 | 12/1991 |
| EP | 0 602 861 A2 | 6/1994 |
| JP | 1-168505 A | 7/1989 |
| JP | 6-306205 A | 11/1994 |
| JP | 7-258470 | 10/1995 |
| JP | 2002-327158 | 11/2002 |
| JP | 2002-338734 | 11/2002 |
| JP | 2003-82586 A | 3/2003 |
| JP | 2003-313369 | 11/2003 |
| JP | 2004-217817 | 8/2004 |

OTHER PUBLICATIONS

Richard J. Lewis, Sr. "Hawley's Condensed Chemical Dictionary, 13th Edition", John Wiley & Sons, Inc., New York p. 1175 (1997).*
Fred W. Billmeyer, Jr,1984) "Textbook of polymer Science, 3rd Edition" John Wiley & Sons, Inc., New York pp. 510-513*** (1984).*

* cited by examiner

*Primary Examiner* — Basia Ridley
*Assistant Examiner* — Alexander C Kollias
(74) *Attorney, Agent, or Firm* — Birch, Stewart, Kolasch & Birch, LLP

(57) ABSTRACT

The present invention provides a rubber composition for coating a belt layer steel cord, which inhibits separation from the steel cord when running the tire. Specifically, the present invention provides a rubber composition for coating a belt layer steel cord comprising (A) 2.5 to 4 parts by weight of sulfur, (B) 0.5 to 5 parts by weight of resorcin or modified resorcin condensate, (C) 0.3 to 3 parts by weight of partial condensate of hexamethylol melamine pentamethyl ether or partial condensate of hexa methoxy methylol melamine, and (D) organic acid cobalt, based on 100 parts by weight of a rubber component; wherein the cobalt content in the organic acid cobalt (D) is 0.05 to 0.8 part by weight based on 100 parts by weight of the rubber component, and a steel cord obtained by coating with the rubber composition.

6 Claims, No Drawings

RUBBER COMPOSITION FOR BELT LAYER STEEL CORD AND STEEL CORD COATED BY THE SAME

BACKGROUND OF THE INVENTION

The present invention relates to a rubber composition for coating a belt layer steel cord, which inhibits separation from the steel cord.

Conventionally, adhesion to the steel cord is required in rubber compositions that coat the steel cord of a belt layer. In order to improve adhesion, the methods of compounding, for example, cobalt salt, silica or resin in the rubber component are known. However, even when these components are compounded in a rubber composition, adhesion with the steel cord is insufficient and there is the problem that the rubber composition separates from the steel cord by running.

In order to solve such problems, disclosed are a rubber composition for a steel belt containing a radical chain inhibitor (JP-A-2003-313369) and a rubber composition for coating a belt layer steel cord containing a special carbon black (JP-A-7-258470). However, because the amount of sulfur is large in both cases, there is the problem that the sulfur crosslinking density increases and the rubber becomes hard (tensile strength at break and elongation at break decrease) when thermally oxidized and degraded.

SUMMARY OF THE INVENTION

The object of the present invention is to provide a rubber composition for coating a belt layer steel cord, which inhibits separation from the steel cord.

The present invention relates to a rubber composition for coating a belt layer steel cord comprising (A) 2.5 to 4 parts by weight of sulfur, (B) 0.5 to 5 parts by weight of resorcin or modified resorcin condensate, (C) 0.3 to 3 parts by weight of partial condensate of hexamethylol melamine pentamethyl ether or partial condensate of hexa methoxy methylol melamine, and (D) organic acid cobalt, based on 100 parts by weight of a rubber component; wherein the cobalt content in the organic acid cobalt (D) is 0.05 to 0.8 part by weight based on 100 parts by weight of the rubber component.

The present invention also relates to a belt layer comprising the rubber composition.

DETAILED DESCRIPTION

The rubber composition for coating a belt layer steel cord of the present invention comprises a rubber component, sulfur (A), resorcin or modified resorcin condensate (B), partial condensate of hexamethylol melamine pentamethyl ether or partial condensate of hexa methoxy methylol melamine (C) and organic acid cobalt (D).

The rubber component is not particularly limited and examples are diene rubber such as natural rubber (NR), styrene butadiene rubber (SBR) and butadiene rubber (BR) and butyl rubber, which are commonly used in the rubber industry. Of these, NR is preferably used, from the viewpoints that the cis structure of polyisoprene is almost 100% and tensile strength is extremely excellent compared to other rubber components. The rubber component can be one kind of rubber or two or more kinds can be used together.

As the sulfur (A), sulfur that is usually used in the rubber industry when vulcanizing (powdery sulfur available from Tsurumi Chemicals Co., Ltd.) can be used.

The content of sulfur (A) is at least 2.5 parts by weight, preferably at least 2.75 parts by weight, based on 100 parts by weight of the rubber component. When the content is less than 2.5 parts by weight, sulfur is not sufficiently supplied to the plating layer of the steel cord and adhesion becomes poor. Also, the content is at most 4 parts by weight, preferably at most 3.75 parts by weight. When the content is more than 4 parts by weight, the sulfur crosslinking density becomes large and resistance and elongation at break become small.

The rubber composition of the present invention contains resorcin or modified resorcin condensate (B). Modified resorcin condensate refers to alkylated resorcin condensate as shown in formula (1). In the formula, n is an integer and R is preferably an alkyl group. Examples of modified resorcin condensate (B) are resorcin-alkyl phenol-formalin copolymer (SUMIKANOL 620 available from Sumitomo Chemical Co., Ltd.) and resorcinol-formaldehyde resin (1319S available from Indspeck Co.).

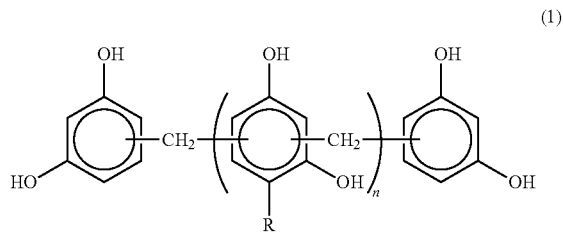

(1)

The content of resorcin or modified resorcin condensate (B) is at least 0.5 part by weight, preferably at least 1 part by weight, based on 100 parts by weight of the rubber component. When the content is less than 0.5 part by weight, the resin crosslinking density and hardness are low. Also, the content is at most 5 parts by weight, preferably at most 3 parts by weight. When the content is more than 5 parts by weight, heat generation becomes large.

The rubber composition of the present invention contains partial condensate of hexamethylol melamine pentamethyl ether (HMMPME) or partial condensate of hexamethoxymethylol melamine (HMMM) (C). Partial condensate of HMMPME refers to the compound represented by formula 2. Partial condensate of HMMM refers to the compound represented by formula 3.

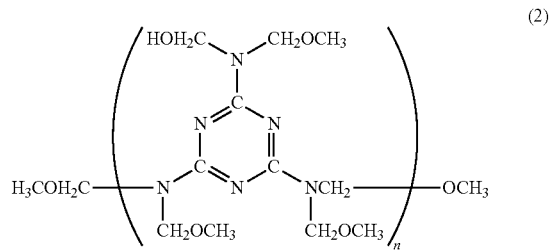

(2)

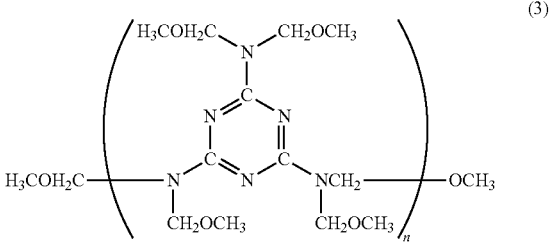

(3)

The content of partial condensate of HMMPME or partial condensate of HMMM (C) is at least 0.3 part by weight, preferably at least 0.6 part by weight, based on 100 parts by weight of the rubber component. When the content is less than 0.3 part by weight, hardness is insufficient. Also, the content is at most 3 parts by weight, preferably at most 2.5 parts by weight. When the content is more than 3 parts by weight, heat generation becomes large.

The rubber composition of the present invention contains organic acid cobalt (D). Organic acid cobalt (D) has the function of crosslinking the cord and the rubber and therefore, by compounding organic acid cobalt (D), adhesion between the cord and the rubber can be improved. Specific examples of organic acid cobalt (D) are cobalt stearate, cobalt naphthenate and cobalt neodecanoate.

The content of organic acid cobalt (D) is at least 0.05 part by weight, preferably at least 0.1 part by weight, based on 100 parts by weight of the rubber component, converted to cobalt. When the content is less than 0.05 part by weight, adhesion between the plating layer of the steel cord and the rubber is insufficient. Also, the content is at most 0.8 part by weight, preferably at most 0.2 part by weight. When the content is more than 0.8 part by weight, oxidization and degradation of the rubber is significant and properties at break become poor.

To the rubber composition of the present invention, besides the rubber component, sulfur (A), resorcin or modified resorcin condensate (B), partial condensate of HMMPME or partial condensate of HMMM (C) and organic acid cobalt (D), reinforcing agents such as carbon black and silica, zinc oxide, antioxidants and vulcanization accelerators can be added accordingly.

When carbon black is compounded as a reinforcing agent, the amount of carbon black is preferably 50 to 75 parts by weight based on 100 parts by weight of the rubber component. When the amount is less than 50 parts by weight, the reinforcing effect, hardness and stiffness may not sufficiently be obtained. When the amount is more than 75 parts by weight, heat generation is large, the rubber composition tends to become hard and processability when kneading the rubber or topping tends to become poor.

When silica is compounded as a reinforcing agent, the amount of silica is preferably at most 15 parts by weight, more preferably at most 2.5 parts by weight, further preferably at most 2 parts by weight, particularly preferably at most 1 parts by weight, based on 100 parts by weight of the rubber component and even more preferably, silica is not contained. When the amount is more than 15 parts by weight, dispersibility of the silica decreases and sufficient hardness may not be obtained.

An example of the antioxidant is a phenylenediamine-type antioxidant and a phenylenediamine-type antioxidant is preferably used from the viewpoint that oxidization and degradation of the polymer can be prevented effectively.

The amount of the antioxidant is preferably at least 0.5 part by weight, more preferably at least 0.7 part by weight, based on 100 parts by weight of the rubber component. When the amount is less than 0.5 part by weight, oxidization and degradation of the polymer may not be prevented. Also, the amount is preferably at most 2 parts by weight, more preferably at most 1.5 parts by weight. When the amount is more than 2 parts by weight, the plating layer of the cord is damaged by the antioxidant and adhesion with the metal cord tends to be inhibited.

The rubber composition of the present invention is coated on a steel cord to form a belt layer, the belt layer is laminated together with other tire parts to form an unvulcanized tire, which is then vulcanized to form a pneumatic tire (such as a radial tire). Herein, the belt layer refers to a breaker layer that is used for a radial tire and serves to tightly fasten the carcass and increase the stiffness of the tread. The rubber composition of the present invention is most preferably used for coating the steel cord in the belt layer, from the viewpoint of the problem that the belt receives large tensile force due to the tire pressure and therefore, large distortion occurs between the belt and another intersecting belt by rolling.

The present invention is explained in detail based on Examples below, but the present invention is not limited thereto.

EXAMPLES 1 TO 3 AND COMPARATIVE EXAMPLES 1 TO 5

The various chemicals used in Examples and Comparative Examples are described below.

Natural rubber: RSS #3
Carbon black N219: LI available from Mitsubishi Chemical Corporation Zinc oxide: Ginrei R available from Toho Zinc Co. Ltd.
Antioxidant: NOCRAC 6C(N-phenyl-N'-(1,3-dimethylbutyl)-p-phenylenediamine) available from Ohuchi Shinko Chemical Industrial Co., Ltd.
Cobalt stearate: cobalt stearate (containing 10% of cobalt) available from Dainippon Ink and Chemicals Inc.
Sulfur: sulfur available from Tsurumi Chemicals Co., Ltd,
Vulcanization accelerator DCBS: Nocceler-DZ-G available from Ohuchi Shinko Kagaku Kogyo Co. Ltd.
Modified resorcin resin: SUMIKANOL 620 available from Sumitomo Chemical Co., Ltd. (formula 4)

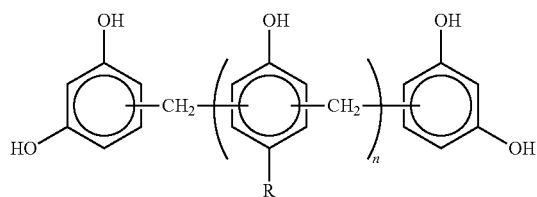

(4)

Partial condensate of hexamethoxymethylol melamine pentamethyl ether (HMMPME): SUMIKANOL 507 (mixture containing about 50% by weight of methylolmelamine resin, silica and oil) available from Sumitomo Chemical Co., Ltd.

According to the composition shown in Table 1, the various chemicals other than sulfur and the vulcanization accelerator were kneaded by a Banbury mixer. Sulfur and the vulcanization accelerator were added to the obtained kneaded rubber and the mixture was kneaded with an open roll to obtain an unvulcanized rubber composition. The unvulcanized rubber composition was vulcanized at 150° C. for 30 minutes to prepare test specimen and the following tests were conducted using the obtained test specimen.

<Hardness>
The hardness of the obtained test specimen was measured using a JIS-A hardness meter.

<Tensile Test (Tensile Strength at Break and Elongation at Break)>
Tensile test was conducted using a No. 3 dumbbell according to JIS-K6251 and the tensile strength at break (MPa) and the elongation at break (%) were measured respectively. The tensile strength at break (MPa) and the elongation at break (%) were also measured in the same way for test specimen, which were thermally oxidized and degraded at a temperature of 80° C. for 96 hours.

The evaluation results for hardness, tensile strength at break and elongation at break are shown in Table 1.

and represented as an index based on the measured value of Example 1 as 100. The larger the value is the superior the durability of the tread (belt layer), thus being favorable.

The evaluation results of the drum test of reproducing separation are shown in Table 1.

TABLE 1

|  | Ex. | | | Com. Ex. | | | | |
| --- | --- | --- | --- | --- | --- | --- | --- | --- |
|  | 1 | 2 | 3 | 1 | 2 | 3 | 4 | 5 |
| Composition (parts by weight) | | | | | | | | |
| Natural rubber | 100 | 100 | 100 | 100 | 100 | 100 | 100 | 100 |
| Carbon black N219 | 65 | 65 | 65 | 65 | 65 | 65 | 65 | 65 |
| Zinc oxide | 10 | 10 | 10 | 10 | 10 | 10 | 10 | 10 |
| Antioxidant | 1 | 1 | 1 | 1 | 1 | 1 | 1 | 1 |
| Cobalt stearate | 1.5 | 1.5 | 1.5 | 1.5 | 1.5 | 1.5 | 0.4 | 1.5 |
| Cobalt content | 0.15 | 0.15 | 0.15 | 0.15 | 0.15 | 0.15 | 0.4 | 0.15 |
| Sulfur | 3.0 | 4.0 | 2.5 | 5.0 | 6.0 | 5.0 | 3.0 | 2.0 |
| Vulcanization accelerator | 1.0 | 1.0 | 1.0 | 1.0 | 1.0 | 1.0 | 1.0 | 1.0 |
| Modified resorcin resin | 2.0 | 1.0 | 3.0 | 1.0 | 1.0 | 2.0 | 2.0 | 2.0 |
| Partial condensate of HMMPME | 1.5 | 1.0 | 2.0 | 1.0 | 1.0 | 1.5 | 1.5 | 1.5 |
| Evaluation results | | | | | | | | |
| Hardness | 74 | 75 | 72 | 75 | 77 | 76 | 74 | 68 |
| Tensile strength at break (MPa) | 25 | 24 | 22 | 20 | 20 | 19 | 24 | 19 |
| After thermal oxidization and degradation | 22 | 21 | 23 | 19 | 18 | 20 | 22 | 18 |
| Elongation at break (%) | 400 | 420 | 460 | 330 | 350 | 340 | 380 | 340 |
| After thermal oxidization and degradation | 350 | 290 | 370 | 200 | 180 | 220 | 350 | 170 |
| Rubber coverage ratio (%) | 95 | 95 | 80 | 95 | 90 | 95 | 60 | 55 |
| After wet thermal degradation | 80 | 85 | 70 | 80 | 90 | 70 | 60 | 40 |
| Peeling resistance | 100 | 100 | 90 | 95 | 100 | 90 | 70 | 60 |
| After wet thermal degradation | 70 | 75 | 65 | 80 | 80 | 80 | 50 | 40 |
| Separation resistance by drum test | 100 | 95 | 100 | 50 | 40 | 50 | 50 | 50 |

A steel cord was coated with the unvulcanized rubber composition to form a belt layer and then vulcanized at 150° C. for 30 minutes to prepare a rubber composition for coating a belt layer steel cord. The following tests were conducted using the obtained rubber composition.

<Adhesion Test (Rubber Coverage Ratio and Peeling Resistance)>

Adhesion test was conducted and the rubber coverage ratio (%) and the peeling resistance of the rubber composition were measured respectively. The rubber coverage ratio represents the proportion of the peeled face that is covered with rubber when the steel cord and the rubber are separated (100%: entire surface is covered). The peeling resistance refers to the tensile resistance of a sample for peeling that is cut out from a tire measured by a tensile testing machine made by Instron Co., which is represented as an index based on the measured value of Example 1 as 100. The rubber coverage ratio and the peeling resistance of the rubber composition were also measured in the same way for rubber compositions, which were thermally oxidized and degraded under the conditions of temperature of 80° C. and humidity of 95% for 150 hours.

The evaluation results for the rubber coverage ratio and the peeling resistance are shown in Table 1.

After a belt layer is formed by coating a steel cord with the unvulcanized rubber composition, the belt layer was laminated together with other tire parts to form an unvulcanized tire and the tire was vulcanized to prepare a radial tire. The following test was conducted.

<Drum Test of Reproducing Separation>

The tire was placed in an oven and degraded for 3 weeks at 80° C. Thereafter, the distance run until swelling of the tread occurred, when the tire was run in a drum at a speed of 80 km/h under the conditions of maximum load (maximum inner pressure condition) by JIS standards of 140%, was measured According to the present invention, by compounding a specific amount of sulfur, resorcin or modified resorcin condensate, partial condensate of hexamethylol melamine pentamethyl ether or partial condensate of hexa methoxy methylol melamine and organic acid cobalt in the rubber composition for coating a belt layer steel cord, the rate of decrease in properties at break after aging of the rubber composition is lowered, adhesion with metal materials is improved and particularly, separation of the rubber composition and the steel cord when running the tire can be inhibited.

What is claimed is:

1. A rubber composition for coating a belt layer steel cord comprising:
   (A) 2.5 to 3.75 parts by weight of elemental sulfur,
   (B) 0.5 to 5 parts by weight of resorcin or modified resorcin condensate,
   (C) 0.3 to 3 parts by weight of partial condensate of hexamethylol melamine pentamethyl ether or partial condensate of hexamethoxymethylol melamine, and
   (D) cobalt salt of organic acid,
   based on 100 parts by weight of a rubber component consisting of 100% by weight of a natural rubber and/or an isoprene rubber;
   wherein the cobalt content in said cobalt salt of organic acid (D) is 0.05 to 0.8 parts by weight based on 100 parts by weight of said rubber component, and wherein said rubber composition does not contain silica.

2. A steel cord coated with a belt layer comprising the rubber composition of claim 1.

3. The steel cord according to claim 2, wherein the cobalt salt of organic acid is selected from the group consisting of cobalt stearate, cobalt naphthenate and cobalt neodecanoate.

4. The rubber composition according to claim 1, wherein the cobalt salt of organic acid is selected from the group consisting of cobalt stearate, cobalt naphthenate and cobalt neodecanoate.

5. A tire having a steel cord coated with a belt layer which comprises a rubber composition comprising:
   (A) 2.5 to 3.75 parts by weight of elemental sulfur,
   (B) 0.5 to 5 parts by weight of resorcin or modified resorcin condensate,
   (C) 0.3 to 3 parts by weight of partial condensate of hexamethylol melamine pentamethyl ether or partial condensate of hexamethoxymethylol melamine, and
   (D) cobalt salt of organic acid,
   based on 100 parts by weight of a rubber component consisting of 100% by weight of a natural rubber and/or an isoprene rubber;
   wherein the cobalt content in said cobalt salt of organic acid (D) is 0.05 to 0.8 part by weight based on 100 parts by weight of said rubber component, and wherein said rubber composition does not contain silica.

6. The tire according to claim 5, wherein the cobalt salt of organic acid is selected from the group consisting of cobalt stearate, cobalt naphthenate and cobalt neodecanoate.

* * * * *